(12) United States Patent
Bradbury et al.

(10) Patent No.: US 7,523,352 B2
(45) Date of Patent: Apr. 21, 2009

(54) SYSTEM AND METHOD FOR EXAMINING REMOTE SYSTEMS AND GATHERING DEBUG DATA IN REAL TIME

(75) Inventors: Jonathan D. Bradbury, Poughkeepsie, NY (US); Scott M. Carlson, Tucson, AZ (US); Trevor E. Carlson, Poughkeepsie, NY (US); Donald P. Crabtree, Port Ewen, NY (US); David A. Elko, Austin, TX (US); Michel Henri Théodore Hack, Cortlandt Manor, NY (US); William M. Sakal, Tivoli, NY (US); Denise M. Sevigny, Wappingers Falls, NY (US); Ronald M. Smith, Sr., Wappingers Falls, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 11/223,887

(22) Filed: Sep. 9, 2005

(65) Prior Publication Data
US 2007/0061628 A1    Mar. 15, 2007

(51) Int. Cl.
*G06F 11/00* (2006.01)
(52) U.S. Cl. .................................. 714/39
(58) Field of Classification Search .............. 714/34, 714/39, 43, 47, 48, 49, 52, 55
See application file for complete search history.

(56) References Cited

U.S. PATENT DOCUMENTS 5,003,256 A * 3/1991 Merrill ...................... 714/814

(Continued)

FOREIGN PATENT DOCUMENTS

CN    1 477 801 A    2/2004

OTHER PUBLICATIONS

Kearney, "Execution Time Dynamic Data Collection at First Detection of Failure", Jun. 1994, IBM Technical Disclosure Bulletin, pp. 391-392.

(Continued)

*Primary Examiner*—Robert Beausoliel
*Assistant Examiner*—Elmira Mehrmanesh
(74) *Attorney, Agent, or Firm*—Scully, Scott, Murphy & Presser, P.C.; John E. Campbell

(57) ABSTRACT

A system, method and computer program product for dynamically debugging a multi-node network comprising an infrastructure including a plurality of devices, each device adapted for communicating messages between nodes which may include information for synchronizing a timing clock provided in each node. The apparatus comprises a plurality of probe links interconnecting each node with a probe device that monitors data included in each message communicated by a node. Each probe device processes data from each message to determine existence of a trigger condition at a node and, in response to detecting a trigger condition, generates a specialized message for receipt by all nodes in the network. Each node responds to the specialized message by halting operation at the node and recording data useful for debugging purposes. In this manner, debug information is collected at each node at the time of a first error detection and collected dynamically at execution time without manual intervention.

20 Claims, 3 Drawing Sheets

U.S. PATENT DOCUMENTS

| | | | |
|---|---|---|---|
| 5,119,377 A | 6/1992 | Cobb et al. | |
| 5,307,354 A * | 4/1994 | Cramer et al. | 714/4 |
| 5,367,670 A * | 11/1994 | Ward et al. | 714/47 |
| 5,491,791 A * | 2/1996 | Glowny et al. | 714/37 |
| 5,793,948 A * | 8/1998 | Asahi et al. | 714/47 |
| 5,848,028 A * | 12/1998 | Burklin | 368/46 |
| 5,870,540 A * | 2/1999 | Wang et al. | 714/43 |
| 5,925,107 A | 7/1999 | Bartfai et al. | 709/248 |
| 5,978,936 A * | 11/1999 | Chandra et al. | 714/43 |
| 6,108,782 A * | 8/2000 | Fletcher et al. | 713/153 |
| 6,134,678 A * | 10/2000 | Mahalingam et al. | 714/48 |
| 6,282,673 B1 * | 8/2001 | Liu et al. | 714/25 |
| 6,327,677 B1 * | 12/2001 | Garg et al. | 714/37 |
| 6,330,008 B1 | 12/2001 | Razdow et al. | |
| 6,405,327 B1 * | 6/2002 | Sipple et al. | 714/39 |
| 6,546,477 B1 | 4/2003 | Russo et al. | |
| 6,601,184 B1 * | 7/2003 | Clark et al. | 714/4 |
| 6,606,362 B1 * | 8/2003 | Dalzell et al. | 375/356 |
| 6,714,563 B1 * | 3/2004 | Kushi | 370/503 |
| 6,754,852 B2 | 6/2004 | Swoboda | |
| 6,769,077 B2 | 7/2004 | Vachon et al. | |
| 6,889,346 B2 * | 5/2005 | Abdelilah et al. | 714/46 |
| 6,892,324 B1 | 5/2005 | French et al. | |
| 6,912,708 B2 | 6/2005 | Wallman et al. | |
| 7,089,452 B2 * | 8/2006 | Rubin et al. | 714/32 |
| 7,171,597 B2 * | 1/2007 | Cho | 714/719 |
| 2003/0217306 A1 | 11/2003 | Harthcock et al. | |
| 2004/0039967 A1 | 2/2004 | Park | |
| 2004/0087303 A1 | 5/2004 | Pugliese | |
| 2005/0033862 A1 * | 2/2005 | Blum et al. | 709/248 |
| 2005/0039065 A1 * | 2/2005 | Cheung et al. | 713/400 |
| 2005/0138484 A1 * | 6/2005 | Moyer et al. | 714/47 |

OTHER PUBLICATIONS

"Remote debugging and viewing the real-time status of peri scripts", Research Disclosure, Dec. 2000, disclosed anonymously, 440086.

* cited by examiner

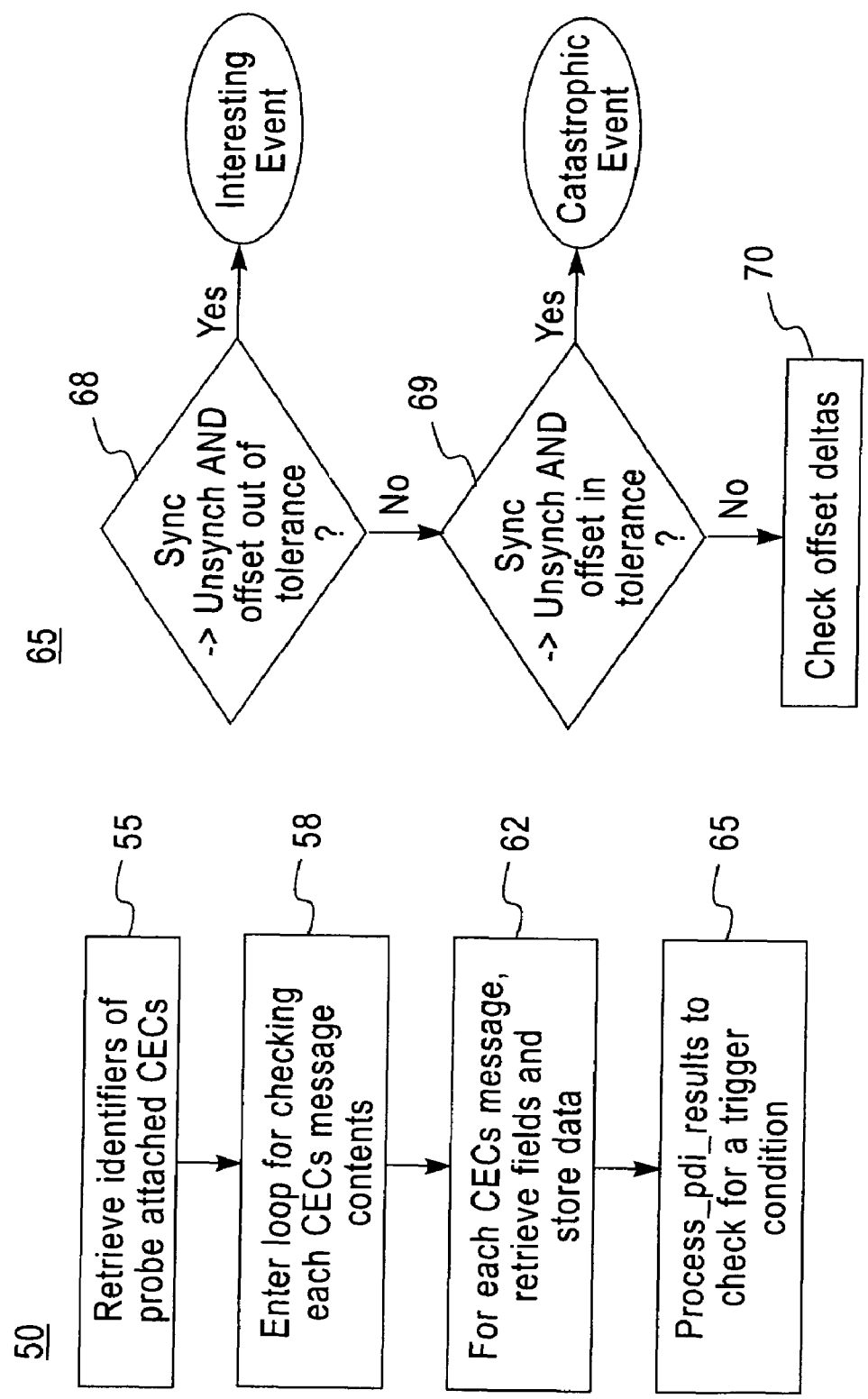

SYSTEM AND METHOD FOR EXAMINING REMOTE SYSTEMS AND GATHERING DEBUG DATA IN REAL TIME

BACKGROUND OF THE INVENTION

1. Field of the Invention

The present invention relates generally to multi-processor/multi-node networks, and particularly to a system and method for dynamically monitoring network packets communicated among the nodes, detecting errors and gathering debug data at the nodes in real-time.

2. Discussion of the Prior Art

Currently, in multi-processor/multi-node networked systems, one processor may experience a problem, but data supporting the debugging of this problem can be lost due to the slow reaction of monitoring tools/personnel monitoring the system, and the number of nodes involved in the network. The problem is further compounded if concurrent timestamped data from many nodes/systems in many locations is required to debug the problem.

U.S. Pat. No. 5,119,377 describes a problem management system for a networked computer system whereby error detection code is placed within the software programs during program development. When an error or failure is detected at a node, a process is executed that captures only the data required to debug the software error. Data to be captured is defined statically before execution time.

U.S. Pat. No. 6,769,077 describes a remote kernel debugging system in which a host computer debugger remotely issues a command to stop execution of the core operating system of a target computer and, a snapshot of the physical memory of a target computer is extracted and stored by the host computer over a serial bus.

Other solutions to this problem include products such as local area network (LAN) "sniffers" which monitor network packets in a passive manner. They collect network packets of a specific type by means of a filter definition. The drawback of such a solution is that data buffers can overflow very quickly and packets of interest can be lost. Furthermore, such solutions do not trigger data collection based on problem occurrence. Another drawback is that any packet analysis requires post-processing of the data.

It would be highly desirable to provide a system and method for collecting information about a program failure occurring at a node of networked computers, where debug information is collected at the time of first error detection and collected dynamically from multiple systems at execution time.

SUMMARY OF THE INVENTION

The present invention is directed to a method and system for monitoring many, remote nodes/systems, examining data passed between the involved systems, and if an error is detected, sending a command for all systems in the network to save its current state/debug data.

The method and system of the invention comprises one or more probe devices that monitor packet communications among many remote nodes/systems and, processes the packets in real time as they are collected at a probe. In this manner, the system is not a passive data collector as in the case of LAN sniffers. Particularly, the probe examines data in real time, and triggers data collection at remote nodes as soon as an error is detected, insuring that all necessary debugging data is collected, at local and remote nodes. This data can be determined on a case-by-case basis for each type of condition being monitored.

According to one aspect of the invention, there is provided a system, method and computer program product for dynamically debugging a multi-node network comprising an infrastructure including a plurality of devices, each device adapted for communicating messages via links between nodes including information for synchronizing a timing clock provided in each node. The apparatus is comprised of probe links interconnecting each node with a probe device that monitors data included in each message communicated by a node. Each probe device processes data from each message to determine existence of a trigger condition at a node and, in response to detecting a trigger condition, generates a message for receipt by all nodes in the network via the probe links instructing each node to collect pertinent debug data and/or halt operation. In this manner, debug information is collected at each node at the time of a first error detection and collected dynamically at execution time without manual intervention.

Advantageously, the system and method of the invention permits for the concurrent collection of debug data from multiple systems. Moreover, the present invention may be employed in systems implementing other protocols whereby information is communicated among nodes of an interconnected network of computer devices for the purposes of debugging such nodes. The triggers used can be defined based on the protocol being analyzed.

BRIEF DESCRIPTION OF THE DRAWINGS

The objects, features and advantages of the present invention will become apparent to one skilled in the art, in view of the following detailed description taken in combination with the attached drawings, in which:

FIG. 2 illustrates a flow chart depicting the methodology 50 implemented by the probe devices in the timing network according to the present invention; and, FIGS. 3A-3B illustrate the steps for detecting one of a variety of trigger conditions in the network and initiating the halt and data save functionality at the nodes of the network according to the invention.

DETAILED DESCRIPTION OF THE PREFERRED EMBODIMENTS

The present invention is directed to a system and method for collecting information about an anomaly at the time of first error detection and collects the information dynamically at execution time.

Figure 1:
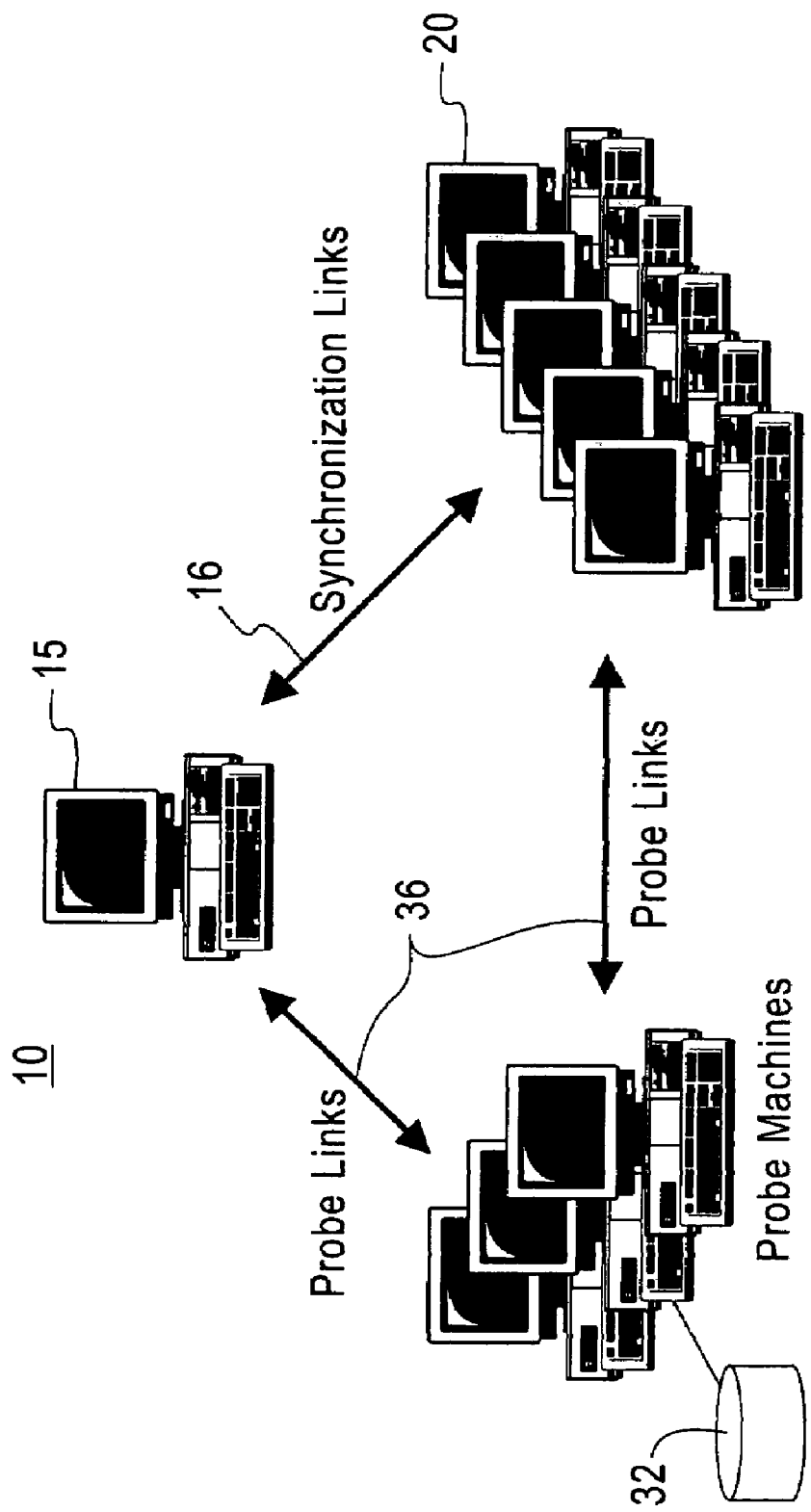
FIG. 1 is a diagram depicting the system 10 in which the present invention is implemented.

FIG. 1 illustrates a networked system 10 implementing the system and method for collecting information about a program failure occurring at a node of networked computers, where debug information is collected at the time of first error detection and collected dynamically at execution time. In one embodiment, the system 10 includes one or more server devices 15 or client devices 20, each device 15, 20 alternately referred to herein as a Central Electronics Complex or CEC which generally means a processor complex, packaged as a single entity. For instance, one CEC 15, 20 may comprise an IBM System z9, or IBM eServer® zSeries® (e.g., zSeries 990 (z990) or zSeries 890 (z890)) system. In FIG. 1, a first CEC or server node 15 is shown connected to one or more CECs or client nodes.

One exemplary application for implementing the present invention is a timing network where clock synchronization is maintained between CECs. In the description of the invention, such a timing network is governed according to Server Time Protocol (STP). According to STP, data packets are sent between nodes in the network to keep each node's clock, for example, a Time-of-Day clock (TOD-clock), in synchronization. As shown in FIG. 1, in accordance with STP, the information provided in packets is communicated over coupling links 16, where each CEC sends/receives data in request/response packets to other system(s) in the STP network. In the timing network depicted in FIG. 1, the timing messages are exchanged periodically between the CEC 15 and each client CEC 20 many times per second (e.g., once every 64 milliseconds).

Suppose it is the case that the links between the CECs suffer a temporary interruption, and the clock at a particular CEC loses synchronization. As it is important to understand why a particular system's clock is out of synchronization with the rest of the timing network, the system of the invention has been developed to enable real-time collecting of data that is relevant to a particular problem. The present invention provides a solution in the form of probes that implements a methodology for collecting data from multiple systems (CECs), at the same time.

As shown in FIG. 1, according to the invention, a plurality of STP probe devices 30 is provided with each probe establishing a path, over a probe link 36, with each CEC node in the network. Each probe device 30 is configured to receive the timing packets generated due to special probe recognition hooks provided in the executing STP main program. The probe is known by the mainline code because of its use of a unique Coordinated Timing Network (CTN) Identifier. Within the STP implementation, there exists an intermessage arrival interval. The speed with which the probe can detect an error is directly related to this time. Thus, if the intermessage interval is on the order of milliseconds, the probe can detect errors within that same number of milliseconds. Upon examining either a single timing packet from a CEC node, or a combination of packets from one or more nodes, if the probe 30 discovers a problem, it generates and sends a specialized packet to all systems in the network to save all relevant debug data to a respective storage means, e.g., a hard drive at the node, for later analysis. This data collection will be triggered within a very short time of the probe 30 determining that an error exists because of the nature of the STP packets utilizing point to point coupling links. Typically, this is on the order of microseconds. When the signal to collect relevant information is received at each system, there is an option to "freeze" the state of all the relevant control blocks in the STP implementation. Thus, when the Probe detects an error, it "immediately" triggers the data collection, rather than waiting for operator intervention. As further shown in FIG. 1, associated with a probe device, is a memory storage device 32 for storing data extracted from fields of each timing packet monitored, and for logging information associated with error conditions detected at each node.

FIG. 2 illustrates a flow chart depicting the methodology 50 implemented by the probe devices in the STP timing network according to the present invention. As will be referred to in FIG. 2, the STP Probe code takes information from the packets received at the Probe system as they are received (e.g., every 64 milliseconds), analyzes them, and immediately decides if the STP network is operating correctly or not. In a first step 55, there is depicted the step of retrieving an identifier for each CEC attached to the probe. Log files for reporting information about each CEC may be initialized at this step. The probe dynamically determines which CECs it will monitor. Via a proprietary diagnostic interface (PDI), the probe is enabled to retrieve the timing packets, analyze them for anomalies, and immediately initiate data collection at the attached CECs.

Thus, as shown at step 58, there is depicted the step of entering a loop that will implement the PDI for checking each node's message array, i.e., retrieving each timing message received at the probe, and saving its contents in a created array (not shown). As depicted at the next step 62, in one example implementation, a run_stp_pdi function is called that retrieves data from the issued packet (e.g., a 256 byte entry) and saves it in an array established for that node. Particular fields in the timing message whose data is extracted include (but are not limited to): the stratum (Stratum level of attached server); timing_state (indicating a timing state of the attached server such as synchronized, unsynchronized, or clock stopped); a root_delay and root_dispersion (with respect to the CECs clock source); a timing_mode (timing mode of the attached server); and, a valid_entry field (indicating whether a message contains valid data). Particularly, as a result of implementing the PDI function call, the data values from these messages are copied to an array specific to the node if this entry has not been retrieved on the previous PDI function call. A special index is implemented to ensure that no entries have been missed, in addition to checking that no entry is a duplicate. In one embodiment, 256 entries per node may be saved in a wrap-around in-storage area.

Because the exemplary embodiment described pertains to a timing protocol, the probe can calculate clock offsets between itself and the CECs it is probing by utilizing the timing data in the packets. These calculated offsets can also be analyzed to conform to specific criteria.

Continuing to step 65, there is depicted the step of processing the PDI results. In one example implementation, a process_pdi_results function is called that checks the current message in the array for a trigger condition. According to the invention, this real-time analysis allows the probe code to inform the operator (1) whether an 'interesting event' has occurred. An 'interesting event' is an unusual event that is not fatal to the STP network; or, (2) whether a 'catastrophic event' has occurred, in response to which the Probe will send a message to each system in the network, directing it to save relevant data and, possibly, halt execution.

FIG. 3A illustrates the steps for detecting a trigger condition. In a first instance, as illustrated at steps 68-69, the probe will first check the "timing state" indicated in the message data and determine whether a state transition has occurred from the synchronized state to the unsynchronized state. If so, then the probe determines whether the reported offset value remained within tolerance. If the offset is out of tolerance, this constitutes an 'interesting' event (the STP network had properly detected this condition), and will be logged as such. However, as indicated at step 69, if it has been determined that a node's timing state has transitioned from a synchronized state to an unsynchronized state and the offset remains within tolerance, this constitutes a 'catastrophic' event and will be handled as such. It is considered catastrophic because two different field values are inconsistent with each other. In a catastrophic case, an additional Debug action is initiated whereby the probe generates, via the PDI interface, a control instruction requiring that execution be halted and debug data collected at each node in the STP network. In response to this control message, data will be immediately recorded at each of the connected nodes of the STP network for debugging purposes. This Debug action is taken for every catastrophic event determined by the probe.

Figure 3B:
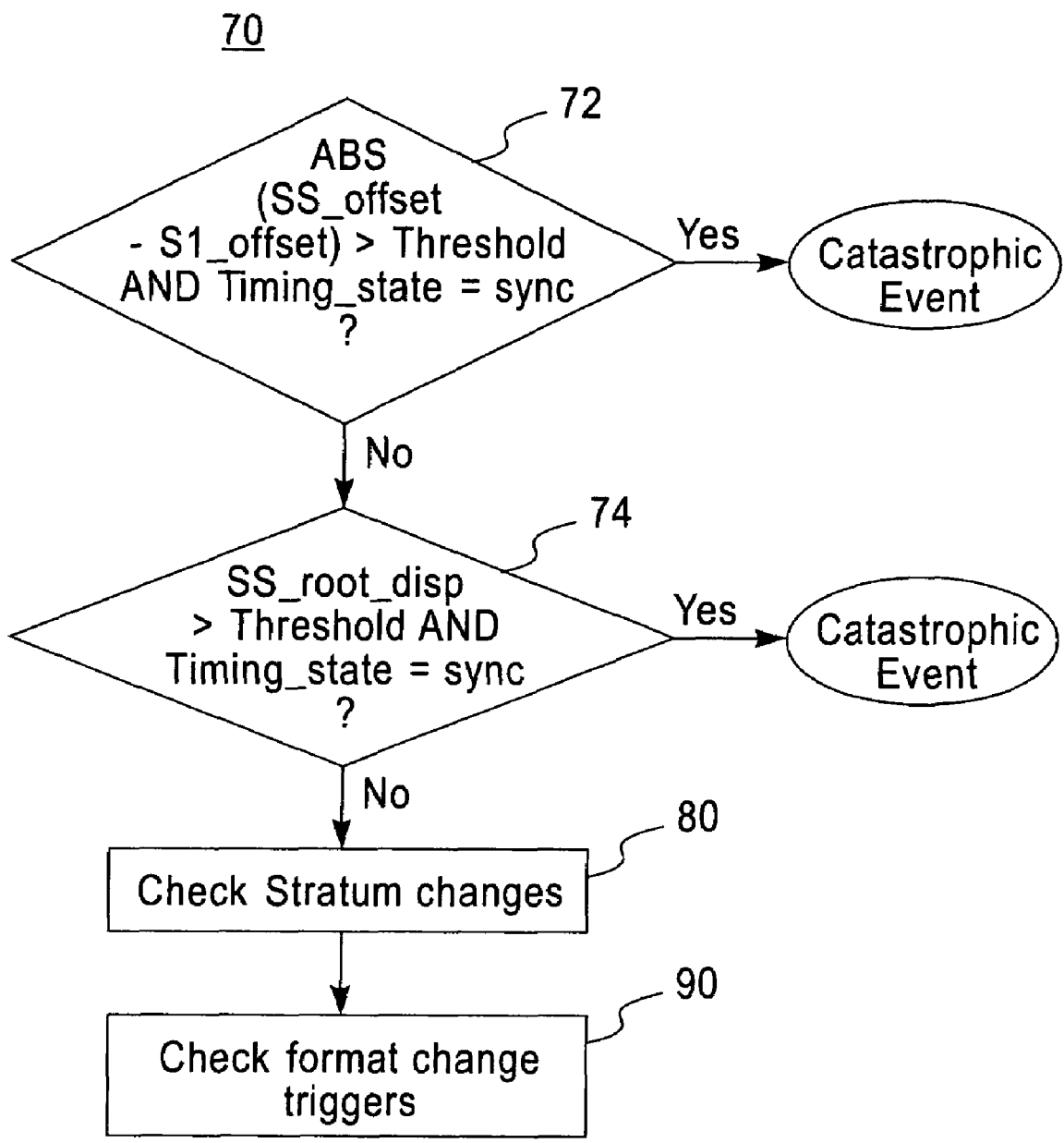

Continuing to step 70, FIG. 3A, there is depicted the step of determining whether probe calculated time offsets are greater than a predetermined value. FIG. 3B depicts step 70 in greater detail. At a first step 72, there is depicted the step of determining whether the absolute value of the difference between the probe calculated offset at a non-Stratum-1 level server (SS_offset) and the offset recorded for the Stratum-1 level server (S1_offset) is greater than a modified_sync_check_threshold value, e.g., between 50 and 150 microseconds and whether the timing state for that other server (SS_timing_state) is synchronized. That is:

---
|SS_offset − S1_offset| > modified_sync_check_threshold AND
SS_timing_state = synchronized

---

If the above conditions are true, it is considered a catastrophic event.

If, at step 72, the condition is held not true, then the process proceeds to step 74 where a first Root Dispersion "sanity check" is performed to determine whether the root dispersion value recorded in the message issued by the server other than a Stratum-1 level server, i.e., SS_root_disp, is greater than a sync_check_threshold value which is a predetermined value for the timing network and is about 50 microseconds, and whether the timing state for that other server is synchronized. That is:

If SS_root_disp>sync_check threshold and AND
SS_timing_state=synchronized

Once again, this is handled as a catastrophic event if the above equation is true.

Other trigger conditions include checks on field values for a predefined range allowed by the protocol being analyzed. An example is shown in step 80, FIG. 3B, where there is depicted the step of detecting a trigger condition as it relates to "Stratum" changes recorded for servers in their timing messages. Thus, at step 80, a comparison is made as to whether the value indicated in the "stratum" field of the most recent timing message has changed as compared to the prior value indicated in the immediately prior timing message for the same server. If the stratum has changed, this indicates an "interesting" event and the action will be logged as such. If, on the other hand, a determination is made that the value indicated in the stratum field is out of a specified range, this constitutes a 'catastrophic' event and will be handled as such. Otherwise, at step 80, if a Stratum-level change is not catastrophic, the process proceeds to step 90, FIG. 3B, where there is depicted the step of detecting a format change trigger condition.

In this particular embodiment, there exist global events, which must happen in a coordinated fashion at all the nodes in the timing network. Triggers are defined to detect when these global changes do not occur at all nodes. Different message formats are used along with a parameter key (ctn_param_key) to indicate these global events. In specific, if the probe determines there has been a format change (via the ctn_param_key field of the timing message), then the probe expects to see the same change at the other nodes within a specified time (i.e. equal to the duration of four (4) subsequent timing messages) by examining their respective timing messages. If the probe does not find a format change indication for each of the attached nodes within four messages (i.e., the ctn_param_key field of the timing message does not change), then this is a 'catastrophic' event and will be handled as such.

Thus, according to the invention, a real-time analysis is performed that allows the probe code to inform the operator of several events. An 'interesting event' is an unusual event that is not fatal to the STP network. The probe code in this case will record this event to the probe's log, along with date and time. One example of an interesting event is the receipt of an invalid timing packet, when the previous packet was valid, or vice versa. The probe also detects 'catastrophic events'. Examples of catastrophic events include, but are not limited to: (a) a packet indicates a stratum level not in the supported range; (b) a required format change was not received within the acceptable time frame and no packets were missed; (c) a packet is received that indicated the timing network is unsynchronized, but the time offsets indicate the network is still within acceptable tolerance, and, (d) change in format, but not a change in key.

Once a probe device 30 has determined that a 'catastrophic event' has occurred, the probe sends a message to each system in the network via the probe links, directing it to save relevant data and, possibly, halt execution. This process will insure that debugging data for the problem detected is available at each system in the network and will allow for analysis of data and problem determination and resolution.

In this embodiment, the probe can also be extended to detect long term clock drift rates between two clocks. For example, the clocks at individual nodes in FIG. 1, i.e., devices 15, 20 may be monitored through the probes from one or more probing machines 30, by using the separate, dedicated probing links. Each probing machine sends probing packets to all the clients and servers. The probing machines do not adjust their local machine clock. Akin to detecting the clock offset and skews by observing the delay measurements, these delay measurements reveal the relative clock behavior between the clock on the device being probed and the clock on the probing machine. This approach enables the observation of the behaviors of all the other clocks relative to the same local clock. The difference in relative behaviors from the same clock indicates the difference between these clocks being probed. In fact, universal clocks using GPS (global positioning system) or PPS (pulse per second service) signals are using the same abstract concept in that the GPS or PPS signals serve the role as the probing station, and the differences between the clocks and the signals are calculated at the local clock level.

Thus, in one embodiment, the probing can be used to detect long term clock drifts between two clocks. The probing can further be used to detect the differences in multiple clocks, possibly between clients and servers, or between different clients, or between clients running different synchronization algorithms. The probing can further be used to study the behaviors of different synchronization algorithms under various adverse environments such as congested links, down links, etc. In an example implementation, after setting up the synchronization environment, including setting up the probing machine(s) 30 and connecting them to the servers and clients, probing packets are communicated from the probing machine(s) at regular intervals to the servers and clients. The data obtained from the probing packets may be analyzed to obtain the actions of the machines being probed. For example, such data may be used to plot the forward and negative backward delays from each machine being probed; obtain a center line between the forward and the negative backward delays, to describe the clock behavior of the machine being probed; or plot the center lines from all the machines being probed and compare.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

It is should be understood that the present invention may be employed in systems implementing other networked protocols whereby information is communicated among nodes of an interconnected network of computer devices for the purposes of debugging such nodes. While it is apparent that the invention herein disclosed is well calculated to fulfill the objectives stated above, it will be appreciated that numerous modifications and embodiments may be devised by those skilled in the art and it is intended that the appended claims cover all such modifications and embodiments as fall within the true spirit and scope of the present invention.

The invention claimed is:

1. An apparatus for dynamic debugging of a multi-node network, said network comprising an infrastructure including a plurality of devices, each device adapted for communicating timing messages between nodes according to a timing protocol governing communication of timing information among nodes in the network for synchronizing system clocks at said nodes, said apparatus comprising:
   a plurality of probe links interconnecting each node of said multi-node network with a probe device, said probe device monitoring data included in each timing message received at each node as communicated according to said timing protocol, and extracting timing state information from said timing message;
   means for processing said extracted timing state information from each message at said probe device to determine existence of a trigger condition at a node, said processing of said extracted timing state information including:
   calculating clock offset values depicting clock offset between the probe device and the clock synchronization data at the respective node being probed; and,
   determining whether a clock state transition has occurred from a synchronized state to an unsynchronized state, coupled with a determination whether a calculated clock offset value is within a specified tolerance;
   said process means determining existence of said trigger condition based on a calculated clock offset value, whether said offset value is within said tolerance, and a corresponding state transition determination at said node; and, in response to detecting a trigger condition, generating a control message for receipt by all nodes in said network via said probe links for halting operation at said node and recording data useful for debugging purposes, whereby debug information is collected at each node at the time of a first error detection and collected dynamically at execution time without manual intervention.

2. The apparatus as claimed in claim 1, wherein a trigger condition is defined for out of range values as defined by said protocol.

3. The apparatus as claimed in claim 1, wherein a trigger condition is defined for inconsistent values across multiple message field contents as defined by said protocol.

4. The apparatus as claimed in claim 1, wherein a trigger condition is defined to detect validation of network changes defined by said protocol.

5. The apparatus as claimed in claim 1, wherein a probe device computes protocol related values relative to the node device it is probing, and compares these values across the plurality of node devices, said trigger condition being defined for cases relating to results of comparing said values.

6. The apparatus as claimed in claim 1, said apparatus used to detect long term clock drift rates between system clocks provided at the node devices.

7. The apparatus as claimed in claim 1, said apparatus used to detect the differences in systems clocks within the timing network running a same or different synchronization algorithm.

8. The apparatus as claimed in claim 1, said apparatus used to determine the behaviors of different synchronization algorithms under various adverse environments.

9. A method for dynamic debugging of a multi-node network, said network comprising an infrastructure including a plurality of devices, each device adapted for communicating timing messages between nodes according to a timing protocol governing communication of timing information to said nodes in the network for synchronizing system clocks at said nodes, said method comprising:
   implementing a probe device for monitoring data included in each timing message received at each node as communicated according to said timing protocol via probe links;
   extracting timing state information from each said timing message;
   processing said extracted timing state information from each message at said probe device to determine existence of a trigger condition at a node, said processing of said extracted timing state information including:
   calculating clock offset values depicting clock offset between the probe device and the clock synchronization data at the respective node being probed; and,
   determining whether a clock state transition has occurred from a synchronized state to an unsynchronized state, coupled with a determination whether a calculated clock offset value is within a specified tolerance;
   said process means determining existence of said trigger condition based on a calculated clock offset value, whether said offset value is within said tolerance, and a corresponding state transition determination at said node; and, in response to detecting a trigger condition,
   generating a control message for receipt by all nodes in said network via said probe links for halting operation at said node and recording data useful for debugging purposes, whereby debug information is collected at each node at the time of a first error detection and collected dynamically at execution time without manual intervention.

10. The method as claimed in claim 9, wherein said processing of data includes determining out of range values as defined by said protocol, said out of range values defining a trigger condition.

11. The method as claimed in claim 9, wherein said processing of data includes determining inconsistent values across multiple message field contents as defined by said protocol, said inconsistent values across multiple message field contents defining a trigger condition.

12. The method as claimed in claim 9, wherein said processing of data includes detecting validation of network changes defined by said protocol, an invalid network change defining a trigger condition.

13. The method as claimed in claim 9, wherein said probe device computes protocol related values relative to the node device it is probing and compares these values across the plurality of node devices, said trigger condition being defined for cases relating to results of comparing said values.

14. The method as claimed in claim 9, said method including: detecting long term clock drift rates between system clocks provided at the node devices.

15. The method as claimed in claim 9, said method including: detecting the differences in systems clocks within the timing network running a same or different synchronization algorithm.

16. The method as claimed in claim 9, said method including: determining the behaviors of different synchronization algorithms under various adverse environments.

17. A program storage device readable by a machine, tangibly embodying a program of instructions executable by the machine to perform method steps for dynamically debugging a multi-node network, said network comprising an infrastructure including a plurality of devices, each device adapted for communicating timing messages between nodes according to a timing protocol governing communication of timing information to said nodes in the network for synchronizing system clocks at said nodes, said method steps comprising:

implementing a probe device for monitoring data included in each message received at each node as communicated according to said timing protocol via probe links;

extracting timing state information from each said timing message;

processing said extracted timing state information from each message at said probe device to determine existence of a trigger condition at a node, said processing of said extracted timing state information including:

calculating clock offset values depicting clock offset between the probe device and the clock synchronization data at the respective node being probed; and, determining whether a clock state transition has occurred from a synchronized state to an unsynchronized state, coupled with a determination whether a calculated clock offset value is within a specified tolerance:

said process means determining existence of said trigger condition based on a calculated clock offset value, whether said offset value is within said tolerance, and a corresponding state transition determination at said node; and, in response to detecting a trigger condition, generating a control message for receipt by all nodes in said network via said probe links for halting operation at said node and recording data useful for debugging purposes, whereby debug information is collected at each node at the time of a first error detection and collected dynamically at execution time without manual intervention, wherein if said probe device discovers a problem, said probe device generates and sends a specialized packet to all systems in said network to save said debug information to a respective storage means for later analysis.

18. The program storage device readable by a machine as claimed in claim 17, wherein said processing of data includes determining out of range values as defined by said protocol, said out of range values defining a trigger condition.

19. The program storage device readable by a machine as claimed in claim 17, wherein said processing of data includes determining inconsistent values across multiple message field contents as defined by said protocol, said inconsistent values across multiple message field contents defining a trigger condition.

20. The program storage device readable by a machine as claimed in claim 17, wherein said processing of data includes detecting validation of network changes defined by said protocol, an invalidated network change defining a trigger condition.

* * * * *